US012115121B2

(12) United States Patent
Fuhrer

(10) Patent No.: US 12,115,121 B2
(45) Date of Patent: Oct. 15, 2024

(54) DEVICE FOR REDUCTION OF VIBRATIONS

(71) Applicant: Papoyama LTD., Nesher (IL)

(72) Inventor: Yehuda Arie Fuhrer, Carmiel (IL)

(73) Assignee: PAPOYAMA LTD, Nesher (IL)

( * ) Notice: Subject to any disclaimer, the term of this patent is extended or adjusted under 35 U.S.C. 154(b) by 1023 days.

(21) Appl. No.: 16/964,990

(22) PCT Filed: Jan. 27, 2019

(86) PCT No.: PCT/IL2019/050107
§ 371 (c)(1),
(2) Date: Jul. 26, 2020

(87) PCT Pub. No.: WO2019/145958
PCT Pub. Date: Aug. 1, 2019

(65) Prior Publication Data

US 2021/0045957 A1 Feb. 18, 2021

Related U.S. Application Data

(60) Provisional application No. 62/622,901, filed on Jan. 28, 2018.

(51) Int. Cl.
*A61H 23/02* (2006.01)
*A61H 1/02* (2006.01)

(52) U.S. Cl.
CPC ... *A61H 1/0288* (2013.01); *A61H 2201/1638* (2013.01); *A61H 2201/165* (2013.01);
(Continued)

(58) Field of Classification Search
CPC ...... A61H 23/02; A61H 1/0288; A61H 23/00; A61H 23/006; A61H 23/008;
(Continued)

(56) References Cited

U.S. PATENT DOCUMENTS 6,695,794 B2 * 2/2004 Kaiser .................. A61B 5/6824 600/595
6,730,049 B2 * 5/2004 Kalvert .............. A63B 21/4017 601/87
(Continued)

FOREIGN PATENT DOCUMENTS

BR 102014023282-6 A2 9/2016
CN 106726042 A 5/2017
(Continued)

OTHER PUBLICATIONS

CN 106726042 Abstract translation, CN 106726042 was provided in IDS dated Jun. 21, 2024 (Year: 2017).*
International Search Report, PCT/IL2019/050107, Apr. 16, 2019.

*Primary Examiner* — Michael R Reid
*Assistant Examiner* — Kira B Daher
(74) *Attorney, Agent, or Firm* — Kristin Grant; Grant Attorneys at Law

(57) ABSTRACT

The present disclosure concerns a system and a method, that include the use of a wearable device, for reducing uncontrolled vibrations of a body part, typically a hand of a subject, which may be a result of neurological disorders, such as Parkinson's disease, Essential tremor, Multiple sclerosis, etc. These involuntary, uncontrolled, vibrations may be continuous and affect the quality life of the subject.

4 Claims, 6 Drawing Sheets

(52) U.S. Cl.
CPC .. *A61H 2201/5084* (2013.01); *A61H 2230/00* (2013.01); *A61H 2230/065* (2013.01); *A61H 2230/425* (2013.01); *A61H 2230/505* (2013.01)

(58) Field of Classification Search
CPC ...... A61H 2201/1638; A61H 2201/165; A61H 2201/5048; A61H 2201/1635; A61H 2201/1207; A61H 2201/50; A61H 2201/5064; A61H 1/0237; A61H 1/0274; A61H 2230/00; A61H 2230/04; A61H 2230/065; A61H 2230/40; A61H 2230/425; A61H 2230/505; A61H 2230/50; A61H 2205/065
See application file for complete search history.

(56) References Cited

U.S. PATENT DOCUMENTS

| | | | | |
|---|---|---|---|---|
| 7,883,479 | B1 * | 2/2011 | Stanley | A61B 5/1101 600/595 |
| 9,802,041 | B2 * | 10/2017 | Wong | A61N 1/0456 |
| 11,701,293 | B2 * | 7/2023 | Carballo | G16H 40/67 601/46 |
| 2003/0006357 | A1 * | 1/2003 | Kaiser | F16F 7/1005 248/550 |
| 2009/0082691 | A1 * | 3/2009 | Denison | A61B 5/30 600/544 |
| 2010/0249637 | A1 * | 9/2010 | Walter | A61H 23/02 601/46 |
| 2014/0336722 | A1 * | 11/2014 | Rocon De Lima | A61N 1/36139 607/45 |
| 2018/0000685 | A1 * | 1/2018 | Maloney | A61N 1/36031 |
| 2018/0140842 | A1 * | 5/2018 | Ó Laighin | A61B 5/112 |
| 2018/0266820 | A1 * | 9/2018 | de Panisse | G01C 19/16 |
| 2018/0289309 | A1 * | 10/2018 | Chen | A61B 5/067 |
| 2018/0356890 | A1 * | 12/2018 | Zhang | G06F 3/014 |
| 2019/0038222 | A1 | 2/2019 | Krimon et al. | |
| 2021/0186794 | A1 * | 6/2021 | Seim | A61H 1/0274 |

FOREIGN PATENT DOCUMENTS

| | | | | | |
|---|---|---|---|---|---|
| CN | 111263627 | A | * | 6/2020 | A61H 1/0285 |
| DE | 102015119741 | A1 | * | 5/2016 | A61B 5/1107 |
| EP | 3571992 | A1 | | 11/2019 | |
| JP | 5439921 | B2 | | 3/2014 | |
| WO | 200180710 | A2 | | 1/2002 | |
| WO | 2015128090 | A1 | | 3/2015 | |
| WO | WO-2015039206 | A1 | * | 3/2015 | A61B 5/11 |
| WO | 2016102958 | A1 | | 6/2016 | |
| WO | WO-2017039550 | A1 | * | 3/2017 | |
| WO | WO-2019067590 | A1 | * | 4/2019 | A61H 1/00 |
| WO | 2019046180 | A1 | | 7/2019 | |
| WO | WO-2020206126 | A1 | * | 10/2020 | A61F 5/0118 |

* cited by examiner

DEVICE FOR REDUCTION OF VIBRATIONS

CROSS REFERENCE TO RELATED APPLICATIONS

This patent application is a U.S. National Phase filing of commonly owned and pending PCT Application No. PCT/IL2019/050107, filed Jan. 27, 2019, claiming priority from U.S. Provisional Patent Application No. 62/622,901, filed Jan. 28, 2017, both which are incorporated herein by reference in their entirety.

TECHNOLOGICAL FIELD

The present disclosure is in the field of wearable devices, in particular assistive wearable device.

BACKGROUND

Neurological disorders such as Essential Tremor are movement disorders that causes involuntary and rhythmic shaking that can affect almost any part of the body. Essential Tremor can occur at any age but is most common in age 40 and older. Essential Tremor may also occur in the parts of the head, e.g. neck. In some cases, Parkinson can also occur simultaneously with Essential Tremor. Though, there are many kind of treatments the shaking resulting from these neurological disorders, none is very efficient and easy to practice. The type of treatment is depended on symptom severity. The treatments include medication, occupational therapy can be helpful or in some cases surgery Deep brain stimulation might be an option.

GENERAL DESCRIPTION

The present disclosure concerns a system and method for reducing uncontrolled vibrations of a body part, typically a hand of a subject, which may be a result of neurological disorders, such as Parkinson's disease, Essential tremor, Multiple sclerosis, etc. These involuntary, uncontrolled, vibrations may be continuous and affect the quality life of the subject. Furthermore, these vibrations may have a varied profile over time, e.g. varied frequency and intensity.

The system according to the present disclosure comprises a wearable device that includes a fitting arrangement configured to be fitted and fixed on the body part of the subject. The fitting arrangement may be formed as a harness or an arm glove to be in a tight association with the limb. The device has one or more motion sensors that are configured to sense the vibrations of the limb, and the sensed motions are analyzed to determine a feedback force, that if applied on the limb, reduces the vibrations thereof.

It is to be noted that the term "motion sensor" throughout the application refers to a sensor that measures the amount of movement/displacement thereof. For example, the motion sensor can measure the uncontrolled vibrations profile of a hand of a subject, namely the movement profile over time of the hand.

The device further includes actuators/force applicators that are configured to execute the feedback force to reduce the vibrations of the limb. By continuously measuring the vibrations of the limb and executing corresponding feedback force thereon, the limb can be stabilized to some extent and perform normal daily functions, e.g. eating.

An aspect of the present disclosure provides a system for reducing vibrations of a body part of a subject. The system includes a wearable device that has a fitting arrangement for fixing the device onto the body part of the subject so as to be in a tight association therewith. One or more motion sensors of the device are configured to sense motion of the body part and generate motion data based thereon. The sensors may be arranged in the device so as to sense different parts of the body part and each may sense movements in 1-, 2- or 3-dimensions.

The device includes actuators that are configured and operable to apply a force profile on the body part that causes a movement of the body part. The actuators are arranged so as to allow to execute a wide range of joint force profiles, namely a net force on the body part applied by all actuators. In other words, the actuators are arranged to permit a feedback and/or feedback torque for generally each vibration scenario of the body part.

The system further includes a control unit that comprises an input module in data communication with the one or more sensor for receiving the motion data, and an analyzer configured to analyze the motion data and generate feedback force profile. The feedback force profile is based on the motion data received from the motion sensors and their mapping arrangement. In other words, the analyzer analyzes the motion data that is derived from each portion of the body part, that corresponds to a motion data of a corresponding motion sensor with a predefined position on the body part. An actuation module is configured to receive the feedback force profile and generate actuation data for the one or more actuators to execute the feedback force profile. The actuation module is operatively connected to the one or more actuators and operate each of them according to the actuation data to obtain the desired feedback force profile.

The actuation data that is generated for each of the one or more actuators depends on the arrangement of the actuators on the body part. The actuation module may pre-determine the position of each of the actuators on the device, that corresponds to a certain position on the body part, and generate the actuation data based thereon. In some embodiments, the motion data includes the real time location of the sensors, at least with respect to a reference location of the device.

Upon execution of the actuation data, the feedback force resulting therefrom reduces the intensity of the body part vibrations in at least one dimension, relative to the normal state of the body part, when no feedback force is executed.

In some embodiments, the motion sensors and/or the actuators are formed on or attached to the fitting arrangement, resulting in a tight-association between the motion sensors and/or the actuators and the body part.

The control unit may be integrated into the wearable device, e.g. into the fitting arrangement, such that all the components of the system are physically associated with the fitting arrangement. However, in some embodiments, the control unit may be remoted from the fitting arrangement. For example, the control unit may an application that is embedded in a smart phone, tablet or any computer with wireless connectivity so as to wirelessly communicate with the physical components of the device, namely the sensors and the actuators.

In some embodiments, the body part is a limb, and in some specific embodiments the limb is an arm or a hand. In these specific embodiments, the device is configured to sense motions from and apply a counter feedback force on a portion of the wrist and/or a portion of the arm. This requires an arrangement of the motion sensors and/or the actuators that allows to controllably execute a desired feedback force along the wrist and/or the arm.

When fitted on a hand/arm, the fitting arrangement may include fastening mechanism for fastening the fitting arrangement to the hand/arm. The fastening mechanism may include a first fastener configured for fitting the fitting arrangement to the wrist and a second fastener for fitting the fitting arrangement to at least one finger.

In some embodiments of the system, the motion sensors may be accelerometers, inertia measurement unit (IMU).

In some embodiments, the system further comprising a physiological sensor for sensing a physiological parameter and generate physiological data based thereon. The physiological parameter may be a pulse/heart rate, blood pressure, temperature, etc. The physiological sensor is in data communication with the input module of the control unit for transmitting the physiological data to the input module. The analyzer is configured to generate the feedback force profile based on the physiological data and the motion data received from the one or more motion sensors. For example, in the instance the physiological sensor is configured to sense pulse of the subject, and an increase pulse rate is sensed, the analyzer may generate such a feedback force profile that has an effect in an actuation data of at least one actuator that results in a higher intensity actuation than would have been with a steady pulse rate.

In some embodiments of the system, the one or more actuators comprise an actuation engine selected from solenoid, piezo-electric element, electric motor or a vibrating element.

In some embodiments of the system, the motion sensors generate motion data that includes a 3-dimensional profile of the motion of the body part portion over time. Each of the motion sensors may be configured to sense a 3-dimensional movement of the body part and the motion data of each sensor is indicative of the 3-dimensional motion profile of the specific portion of the body part it measures.

In some other embodiments, the motion sensors generate motion data that includes a 1- or 2-dimensional profile of the motion of the body part portion over time. In this embodiment, the motion sensors are arranged to sense motions from at least 3 independent axes to generate together a motion data that is indicative of a 3-dimensional movement of the body part. The analyzer that receives and analyzes the motion data from the plurality of motion sensors, generates a 3-dimensional profile of the body part based thereon.

Each of the actuator may be configured to apply a force along at least one axis. The combination of forces applied by a plurality of actuators generates the net force, namely the feedback force profile, which is a 3-dimensional force. In some embodiments, each of the actuators is configured to apply a 3-dimensional force.

In some embodiments, the wearable device comprises at least three actuators that are actuated together to generate a desired net force and torque profile over time. The actuators are arranged such that the applied net force, of the combination of all the actuators' forces, spans a 3-dimensional space. In other words, any desired 3-dimensional force profile, in the limits of the actuators power, may be applied on the body part.

The actuation data may be constituted by a plurality of components, each corresponding to a specific actuator. In other words, the actuation module generates actuation data that comprises an actuation profile for each of the actuators, and the actuation module is configured to execute the actuation profile in each of the actuators to obtain the desired feedback force profile.

In some embodiments, the control unit is integral with or attached to the fitting arrangement.

Once the actuation module executes the actuation data in each of the actuators, the intensity of the vibration of the body part are reduced by at least 10%, 15%, 20%, 25%, 30%, 35%, 40%, 45% or at times by at least 50% in at least one dimension. The reduction of the vibrations is measured with respect to the scenario where the system is not being used, namely the natural vibration of the body part (e.g. in a result of a neurological disorder). The reduction may also be accounted to a net 2- or 3-dimensional of the vibrating component of the body part, namely a reduction of some extent of the total vibration of the body part.

In some embodiments, the feedback force profile has a generally periodical pattern. The actuation module actuates the actuators to perform a force that has at least one component of the force that is characterized by a periodical profile. The periodical profile may include a maximum force value and may have a frequency range between 1-3, 1-5, 1-7 and at times 1-10 Hz.

In some embodiments, the analyzer is configured to filter-out non-vibrating components from the motion data, such that the feedback force profile is generated only based on the vibrating motion component. In other words, the analyzer is configured to identify the controlled motion of the body part in the motion data and separate it from the uncontrolled motion. The analyzer generates the feedback force profile based on the data pieces of the motion data that are indicative of the uncontrolled, vibrating motion of the body part of the subject.

Another aspect of the present disclosure provides a method for reducing vibrations of a body part of a subject. The method includes sensing motion of the body part and generating motion data based thereon. The motion data may include vibrating and non-vibrating components of the movement of the body part. Based on the motion data, generating a feedback force profile that is configured to counter the vibrating component of the movement of the body part and stabilize it. Therefore, the method further comprises applying the feedback force profile on the body part to reduce the intensity of the body part vibrations in at least one dimension.

In some embodiments of the method, the body part is a limb, or more specifically a hand. A shaking/vibrating hand is common in subject suffers from neurological disorders.

In some embodiments, the method further includes sensing a physiological parameter and generating physiological data based thereon. The physiological data may comprise data related to a pulse, blood pressure, temperature or respiration rate of the subject. The step of generating the feedback force profile is performed based on either the motion data, the physiological data or any combination thereof.

In some embodiments of the method, the sensing motion of the body part comprises collecting a 3-dimensional profile of the motion of the body part over time in some embodiments of the method, applying the feedback force profile on the body part comprises executing a 3-dimensional force profile.

In some embodiments of the method, the reduction of the intensity of body part vibration is by at least 10%, 15% or at times by at least 20% in at least one dimension. The reduction may also be accounted to a net 2- or 3-dimensional of the vibrating component of the body part, namely a reduction of some extent of the total vibration of the body part.

In some embodiments of the method, the feedback force profile has a periodical pattern. As vibrations tends to be periodic, the periods thereof can be identified and the feedback force profile may be characterized by periodic pattern that matches the periodical profile of the vibrations.

In some embodiments, the method further includes filtering out non-vibrating components from the motion data. The non-vibrating components are considered as controlled movement of the body part and the feedback force profile is generated based only on the vibrating motion component. In this manner, the controlled and desired motions of the body part are not interrupted by the feedback force profile that is applied on the body part.

It is to be noted, that the vibrations that are being reduced by the method according to the present disclosure are involuntary, uncontrolled, vibrations, e.g. tremor. These vibrations can be derived from a neurological disorder that results in such vibration effects. Examples for neurological disorders or conditions that may produce such vibrations are multiple sclerosis, strokes, traumatic brain injuries, chronic kidney diseases, neurodegenerative diseases, e.g. amyotrophic lateral sclerosis, Parkinson's disease, Alzheimer's disease, and Huntington's disease.

BRIEF DESCRIPTION OF THE DRAWINGS in order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The following figures are provided to exemplify embodiments and realization of the present disclosure.

Figure 1A:
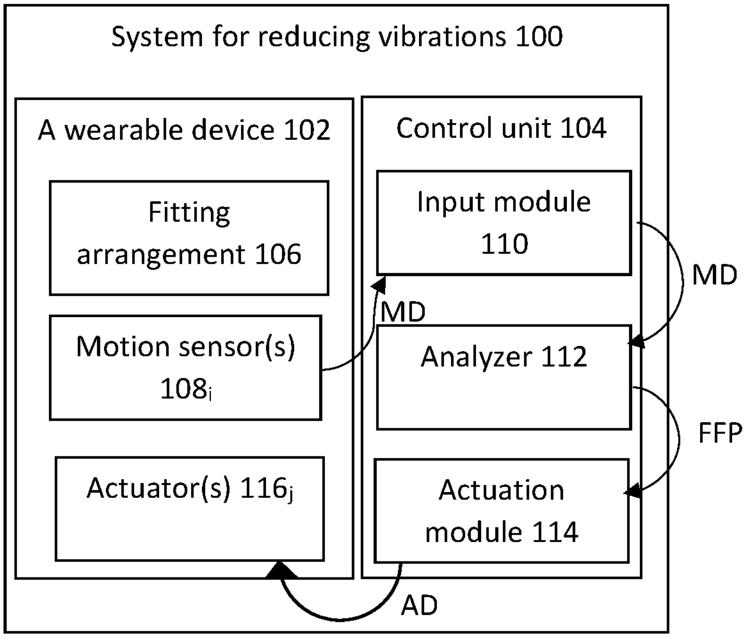
FIGS. 1A-1C are block diagrams of non-limiting examples of embodiments according to the system of the present disclosure.
Figure 1B:
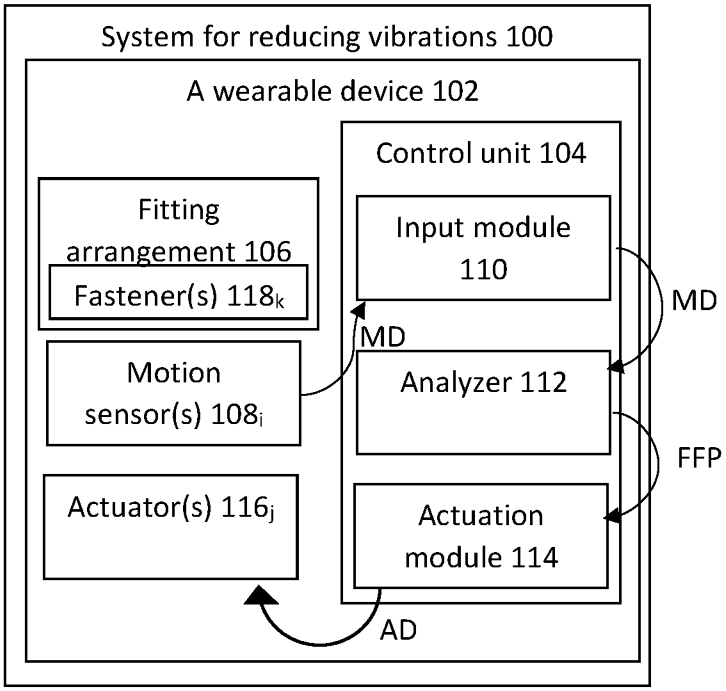
Figure 1C:
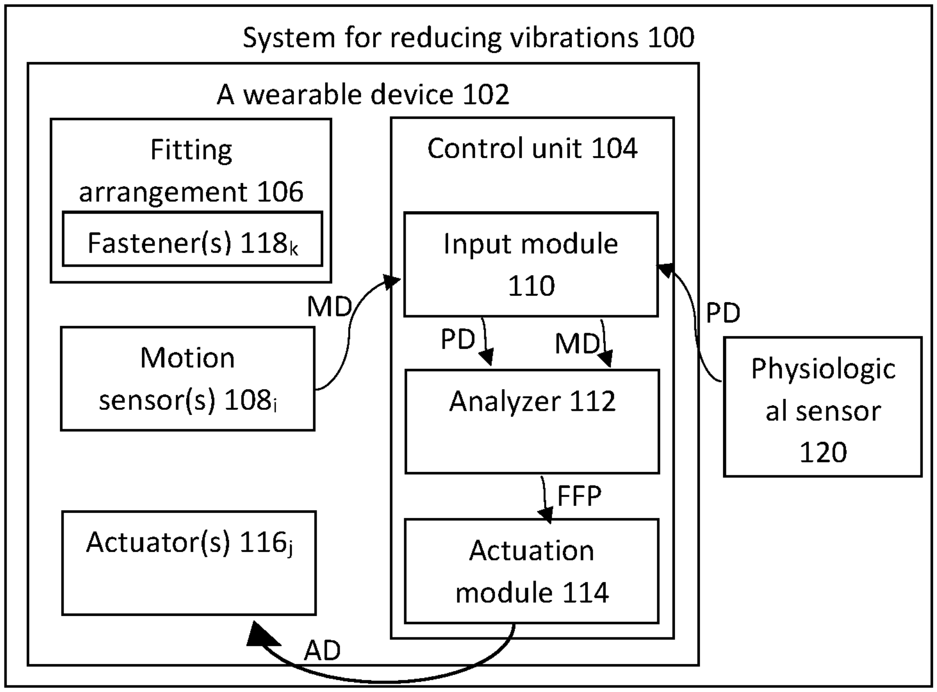

FIGS. 1A-1C are block diagrams of non-limiting examples of embodiments of the system of the present disclosure. Reference is first made to FIG. 1A exemplifying a system for reducing vibrations of a body part 100 that includes a wearable device 102 and a control unit 104. The wearable device 102 comprises a fitting arrangement 106 for fitting and fixing the wearable device 102 on the body part. One or more motion sensors 108$_i$ (where i=the number of motion sensors) are fixed to the wearable device 104 to sense the motion of the body part and generate motion data MD based on the sensed motion of the body part. The motion sensors 108$_i$ transmits the motion data MD to an input module 110 of the control unit 104, that in turn communicates the motion data MD to an analyzer 112 of the control unit 104 to be processed and analyzed.

The analyzer 112 processes the motion data MD and to determine motion profile of the body part, and identify the uncontrolled motion, vibrating component of the motion profile. Based on the determined uncontrolled motion component of the motion profile, the analyzer 112 generates feedback force profile FFP that, if executed, counters the uncontrolled motion component of the body part and reduces the intensity thereof. The Analyzer 112 transmits the feedback force profile to an actuation module 114 that translate it to an actuation data AD for each of a plurality of actuators 116$_j$ (where j=the number of actuators). The actuation module 114 is configured and operable to execute the actuation data. AD and operate the actuators 116$_j$ based thereon.

FIG. 1B shows another embodiment of the system of the present disclosure. In this embodiment, the system 100 includes a wearable device 102 that comprises also the control unit 104. The control unit 104 is integrated into the wearable device 102 such that all data collection, processing thereof and execution of counter forces are carried out by components embedded in the wearable device 102.

Furthermore, in this embodiment of the system, the fitting arrangement 106 comprises fasteners 118$_k$ (where k=the number of fasteners) configured for controllably fastening the wearable device 102 to a desired body part that needs a vibration reduction.

FIG. 1C is another embodiment of the system that differs from that of FIG. 1B by including a physiological sensor 120 that is configured to sense a physiological parameter of the subject. Behavior of physiological parameters of the subject may affect the operation of the system 100, specifically affect the generated feedback force profile FFP and the actuation data AD.

The physiological sensor 120 senses the physiological parameter and generate physiological data PD based thereon, and the physiological sensor 120 transmits the physiological data PD to the input module 110. The input module 110 communicates the physiological data PD to the analyzer 112 that responds to said physiological data. PD by generating the feedback force profile based on the combination of the motion data MD and the physiological data PD.

It is to be noted, that in some embodiments of the system, the physiological sensor 120 may be integrated into the wearable device 102.

The physiological sensor 120 may be configured to measure heart rate, blood pressure, ECG, respiration rate, etc.

It should be noted that the examples of FIGS. 1A to 1C focus on selected elements of the system while generally describe various configurations of the vibrations reducing system. Generally system elements from FIGS. 1A to 1C may be combined between them to provide the alerting system of the present invention.

Further, in the figures throughout the application, like elements of different in figures were given similar reference numerals shifted by the number of hundreds corresponding to the number of the figures. For example, element 202 in FIG. 2 serves the same function as element 102 in FIGS. 1A-1C.

Figure 2:
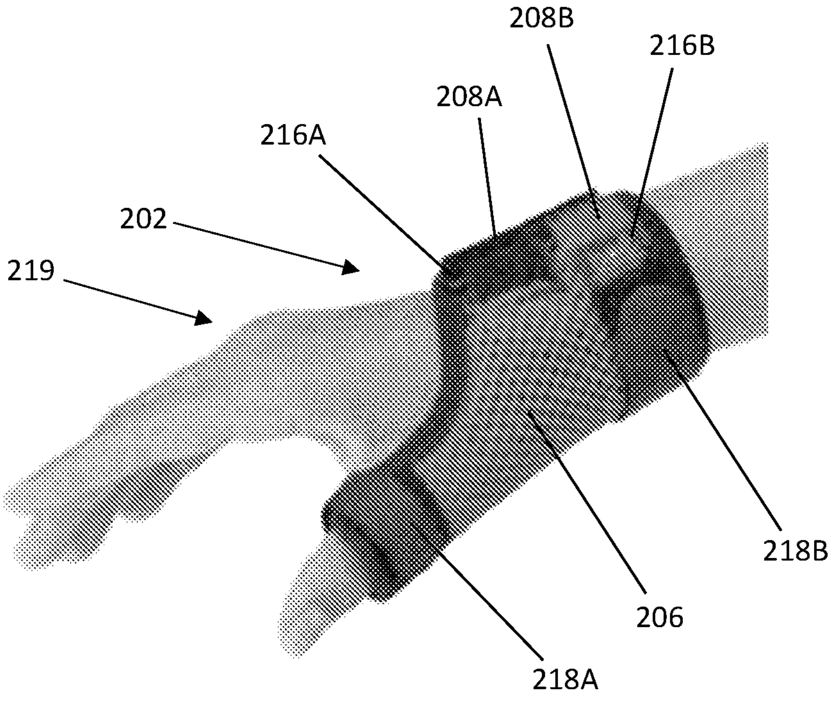
FIG. 2 is an illustration of a hand of a subject fitted with a non-limiting example of an embodiment of the wearable device of the present disclosure.

FIG. 2 is an illustration of a non-limiting example of an embodiment of the wearable device of the present disclosure, worn on a hand of a subject. The wearable device 202 has a fitting arrangement 206 that is adapted to be worn on a hand 219 of a subject. The wearable device 202 is fastened to the hand 219 by two fasteners 218A and 2188 and is integral with motion sensors 208A and 2088, and actuators 216A and 216B. the motion sensors 208A, 2088 and the actuators 216A, 216B are spatially arranged to allow sensing of and force applying on different portions of the hand 219. As described above, this wearable device 202 is part of a system that further comprising a control unit that process motion data that is received from the motion sensors and operates the actuators in response to said motion data.

Figure 3A:
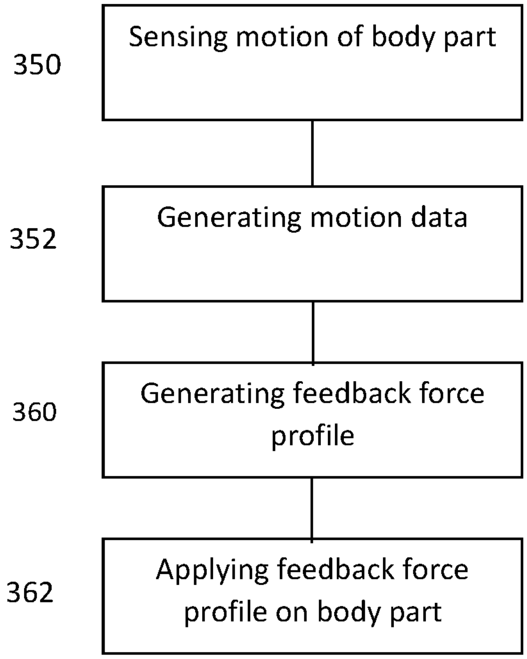
FIGS. 3A-3B are flow diagrams of non-limiting examples of embodiments of the method according to the present disclosure.
Figure 3B:
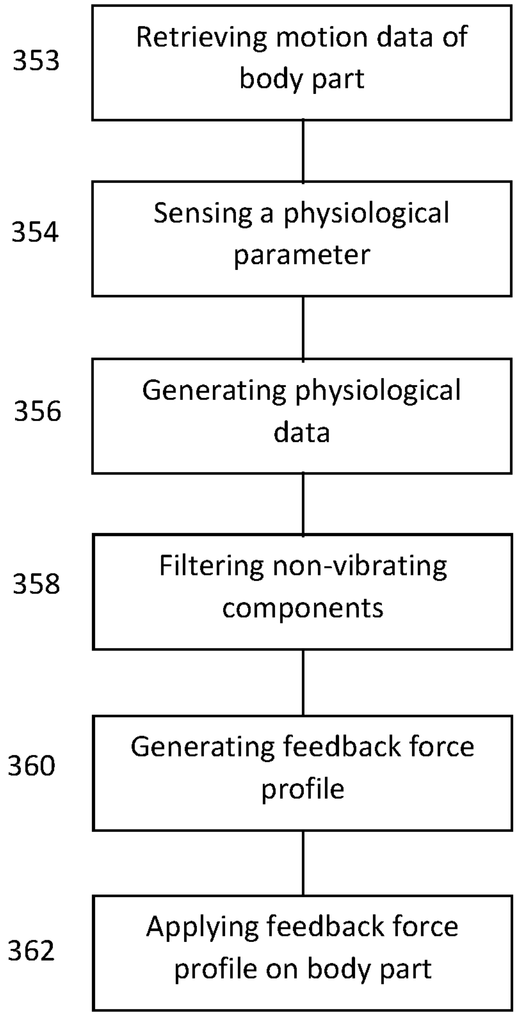

FIGS. 3A-3B are flow diagrams of non-limiting examples of embodiments of the method according to the present disclosure.

According to FIG. 3A, the method includes sensing motion of the body part 350 that its vibrations are required to be reduced and generating motion data 352 based thereon. The sensing may be carried out, for example, by one or more motion sensors that are mounted on the body part. Based on the motion data, generating feedback force profile 360 that, if executed, counters the vibrations of the body at least to some extent. The method further includes applying the feedback force profile on the body part 362 to reduce the vibrations thereof in at least one dimension to some extent.

FIG. 3B shows another embodiment of the method of the present disclosure. In this embodiment, the method includes retrieving motion data of the body part 353, irrespective to how it was obtained and/or generated. The method further includes sensing a physiological parameter 354 and generating physiological data 356 based thereon. The physiological parameter may be selected from any one of heart rate, blood pressure, respiration rate, temperature, etc. The method may include filtering of non-vibrating components of the motion data 358, namely controlled movements of the body part. Based on the filtered motion data and the physiological data, generating feedback force profile 360 and applying it on the body part 362.

It should be noted that the order of the steps of the method as presented in FIGS. 3A-3B are not limiting and some may be interchangeable. Furthermore, the method of the present invention may be carried out by any combination of elements of the embodiments of FIGS. 3A-3B.

The invention claimed is:

1. A system for reducing vibrations of a body part of a subject, the system comprising:

a wearable device configured to be fitted and fixed on the body part of the subject in a tight association with the body part, comprising:

one or more motion sensors arranged integrally with the wearable device with tight association between each of the motion sensors and the body part when the wearable device is fitted on the body part, each of the motion sensors is configured to sense motion of the body part at the at the location of the motion sensor and generate motion data based thereon, and one or more force applicators spatially arranged across and integrally with the wearable device, with tight association between each of the force applicators and the body part at the location of the force applicator when the wearable device is fitted on the body part, each of the force applicators configured and operable to apply a force profile on said body part at the location of the force applicator to cause movement of said part; and a control unit comprising:

an input module linked to said one or more sensor for receiving said motion data;

an analyzer configured to analyze the motion data and generate a joint feedback force profile according to the locations of the force applicators on the wearable device and their respective tightly associated locations on the body part; and an actuation module configured to generate actuation data for each of the force applicators based on the joint feedback force profile and based on the locations of the force applicators, and to activate each of the force applicators based on its respective actuation data to apply force at its respective location on the body part, to impart said joint feedback force profile by joint actuation of the force applicators, wherein, when executed, the joint feedback force profile reduces the intensity of the body part vibrations in at least one dimension; and a physiological sensor configured for sensing a physiological parameter, and generating physiological data based thereon, and for transmitting the physiological data to the input module, wherein the analyzer is configured to generate the feedback force profile based on the motion data and the physiological data.

2. The system of claim 1, wherein the physiological sensor is configured to sense heart rate of the subject, and the generated force profile includes a force intensity that depends on the sensed heart rate.

3. A method for reducing vibrations of a body part of a subject, the method comprising:

receiving motion data from one or more motion sensors with tight association between each of the motion sensors and the body part, each of the motion sensors is configured to sense motion of the body part at the location of the motion sensor and generate motion data based thereon, an analyzer configured to analyze the motion data and generate a joint feedback force profile according to the locations of a plurality of force applicators arranged on the body part, and an actuation module configured to generate actuation data for each of the force applicators based on the joint feedback force profile and based on the locations of the force applicators on the body part, and to activate each of the force applicators based on its respective actuation data to apply force at its respective location on the body part, to impart said joint feedback force profile by joint actuation of the force applicators, wherein, when executed, the joint feedback force profile reduces the intensity of the body part vibrations in at least one dimension; and receiving a physiological data from a physiological sensor sensing a physiological parameter, and generating the feedback force profile based on the motion data and the physiological data.

4. A method for reducing vibrations of a body part of a subject, the method comprising:

receiving motion data from one or more motion sensors with tight association between each of the motion sensors and the body part, each of the motion sensors is configured to sense motion of the body part at the location of the motion sensor and generate motion data based thereon, an analyzer configured to analyze the motion data and generate a joint feedback force profile according to the locations of a plurality of force applicators arranged on the body part, and an actuation module configured to generate actuation data for each of the force applicators based on the joint feedback force profile and based on the locations of the force applicators on the body part, and to activate each of the force applicators based on its respective actuation data to apply force at its respective location on the body part, to impart said joint feedback force profile by joint actuation of the force applicators, wherein, when executed, the joint feedback force profile reduces the intensity of the body part vibrations in at least one dimension, wherein the generated force profile includes a force intensity that depends on sensed heart rate.

* * * * *